Oct. 30, 1928.
E. C. MYERS
1,689,797
FIXTURE FOR SHAVING OFF FILLINGS IN CLUTCH PLATES
Filed March 2, 1927
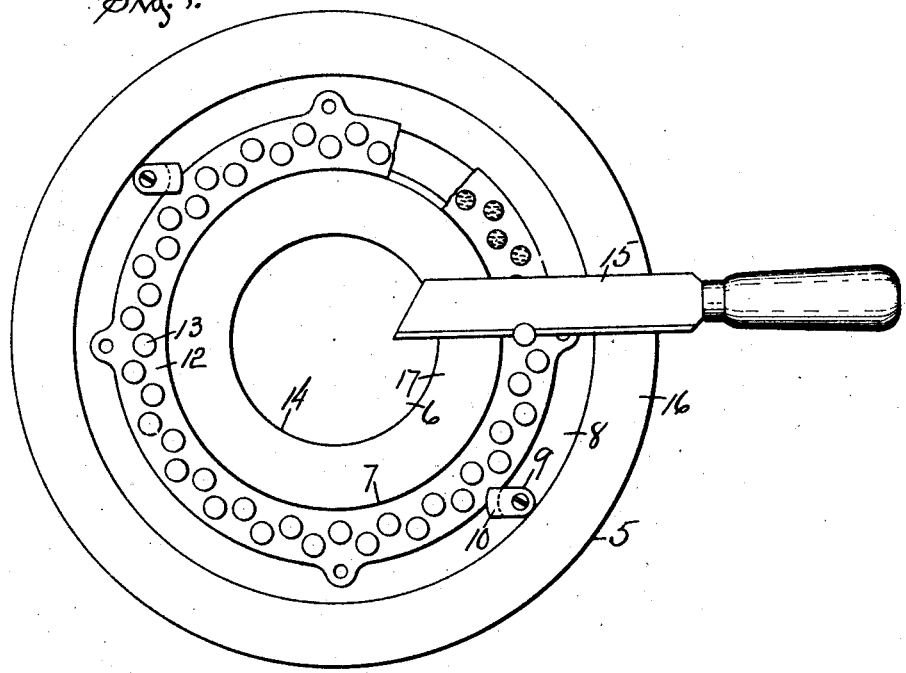
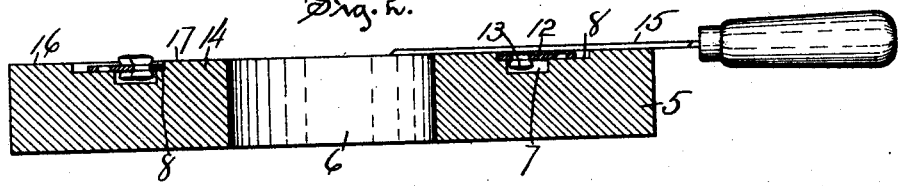
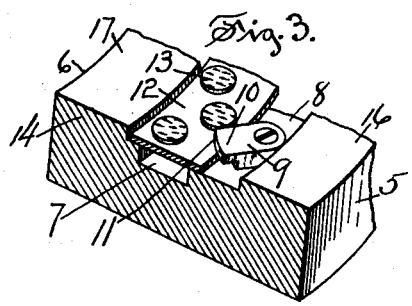
INVENTOR
Ernest C. Myers.
by
Arthur B. Jenkins,
ATTORNEY Patented Oct. 30, 1928.

1,689,797

UNITED STATES PATENT OFFICE.

ERNEST C. MYERS, OF NORWICH, CONNECTICUT.

FIXTURE FOR SHAVING OFF FILLINGS IN CLUTCH PLATES.

Application filed March 2, 1927. Serial No. 172,173.

My invention relates to the class of devices that are employed for shaving off the ends of fillings of cork or other material commonly used in most of the clutches, and especially as embodied in automobile construction, and an object of my invention, among others, is the production of a device of this class by means of which such fillings may be shaved off in a particularly rapid and efficient manner.

One form of fixture embodying my invention and in the construction and use of which the objects herein set out, as well as others, may be attained, is illustrated in the accompanying drawings, in which—

Figure 1 is a top view of a fixture embodying my invention.

Figure 2 is a view in central cross section through the same.

Figure 3 is a view of a fragment of the base of my improved fixture showing the operation of the clamp for securing a plate or ring in place in said fixture.

In the accompanying drawings the numeral 5 indicates the base of my improved fixture that may be made from any suitable material, preferably metal, this base, as herein shown, being round and having a central opening 6. A groove 7 is formed in the base, extending concentrically therein, and a shelf 8 constitutes a part of said groove on each side thereof. Clamps 9 are pivotally mounted on the shelves, these clamps being supplied in any suitable number, and each clamp has a clamping lip 10, as shown in Figure 3. The under side of this clamping lip is tapered toward one edge forming a cam 11, whereby, as the clamp is rotated on its pivot, said lip will be brought tighter and tighter into engagement with a clutch plate or ring 12.

In clutches commonly employed at the present time, the clutch plates or rings 12 are used, and fillings 13 are located in holes in said plates or rings. These fillings are commonly composed of cork or similar material and they are driven into the holes in the rings so that they protrude at opposite sides thereof. The ends of these fillings are then cut off so that they will all be located in the same plane.

Where the rings are manufactured in quantities this evening off of the ends of the fillings has been done by machinery and in such event it is a comparatively simple matter. However, in garages where comparatively little of this work is required this renewal of the fillings embodying the evening off of the ends, is somewhat expensive, and it is to overcome this objection and to provide a device by means of which this operation may be effected by the ordinary garage worker that this invention has been made.

In the operation of the device when the fillings 13 have been secured in place the ring is placed upon the fixture, resting upon the shelves 8 at opposite sides of the groove 7, a boss 14 being formed on the fixture and around which the ring 12 may fit, as shown in Figure 1 of the drawings.

The clamps 9 are then brought into tight engagement with the ring to secure it in place. A knife 15 may now be employed to shave off the ends of the fillings which will project above the plane of guiding surfaces 16—17 formed on opposite sides of the groove 7, these guiding surfaces being composed of the boss 14 and the outer part of the base bounding the groove 7.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A fixture for supporting a clutch plate during the shaving off of fillings which project beyond opposite faces of a plate, said fixture comprising a base having surfaces for contacting with the plate free of said fillings to support and hold the plate, and a guide surface for the reception of a cutting element located adjacent the aforesaid surfaces.

2. A fixture for supporting a clutch plate during the shaving off of fillings which project beyond opposite faces of a plate, said fixture comprising a base having surfaces for contacting with the plate free of said fillings to support and hold the plate, means for securing the plate against said surfaces, and a guide surface for the reception of a cutting element located adjacent the aforesaid surfaces.

3. A fixture for supporting a clutch plate during the shaving off of fillings which project beyond opposite faces of a plate, said fixture comprising a base having surfaces for contacting with the plate free of said fillings to support the plate with either face exposed and to hold the plate against lateral movement, means for releasably clamping the plate against said surface, and a guide surface for the reception of a cutting element located adjacent the aforesaid surfaces.

4. A fixture for supporting a clutch plate during the shaving off of fillings which project beyond opposite faces of a plate, said fixture comprising a base having a flat surface formed with a groove to receive a plate, said groove being provided with shelves on opposite sides thereof which are raised a proper distance to support the plate with the depending fillings free from the floor of the groove and with the upwardly extending fillings arranged to project above the flat face of the base the amount to be shaved off.

5. A fixture for supporting a clutch plate during the shaving off of fillings which project beyond opposite faces of a plate, said fixture comprising a base having a flat surface formed with a groove to receive a plate, said groove being provided with shelves on opposite sides thereof which are raised a proper distance to support the plate with the depending fillings free from the floor of the groove and with the upwardly extending fillings arranged to project above the flat face of the base the amount to be shaved off, and means for clamping the plate against said shelves.

6. A fixture for supporting a clutch plate during the shaving off of fillings which project beyond opposite faces of a plate, said fixture comprising a round base having a flat face formed with a concentric groove to receive the plate, the inner side wall of the groove being of a proper size to snugly fit the inner edge of the plate to prevent lateral movement of the latter, said groove being provided with shelves on opposite sides thereof which are raised a proper distance to support the plate with the depending fillings free from the floor of the groove and with the upwardly extending fillings arranged to project above the flat face of the base the amount to be shaved off.

ERNEST C. MYERS.